United States Patent
Fossum et al.

(10) Patent No.: US 7,092,021 B2
(45) Date of Patent: Aug. 15, 2006

(54) FRAME SHUTTERING SCHEME FOR INCREASED FRAME RATE

(75) Inventors: Eric R. Fossum, La Crescenta, CA (US); Sandor L. Barna, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 704 days.

(21) Appl. No.: 09/792,292

(22) Filed: Feb. 22, 2001

(65) Prior Publication Data

US 2001/0024238 A1 Sep. 27, 2001

Related U.S. Application Data

(60) Provisional application No. 60/184,202, filed on Feb. 22, 2000.

(51) Int. Cl.
*H04N 3/14* (2006.01)
*H04N 5/335* (2006.01)
*H01L 27/00* (2006.01)

(52) U.S. Cl. ............... 348/305; 348/296; 348/308; 348/322; 250/208.1

(58) Field of Classification Search ............ 348/208.6, 348/208.3, 216.1, 217.1, 218.1, 305, 308, 348/309, 307, 317, 316, 320, 296, 321, 322, 348/323, 324, 312, 335, 220.1
See application file for complete search history.

(56) References Cited

U.S. PATENT DOCUMENTS

| | | | | |
|---|---|---|---|---|
| 3,814,846 A | * | 6/1974 | Snow | 348/316 |
| 4,322,752 A | * | 3/1982 | Bixby | 348/312 |
| 4,330,796 A | * | 5/1982 | Anagnostopoulos et al. | 348/322 |
| 4,339,775 A | * | 7/1982 | Lemke et al. | 386/81 |
| 4,785,353 A | * | 11/1988 | Seim | 348/241 |
| 5,321,509 A | | 6/1994 | Kannegundla | |
| 5,396,091 A | * | 3/1995 | Kobayashi et al. | 257/241 |
| 5,436,662 A | | 7/1995 | Nagasaki et al. | |
| 5,463,421 A | * | 10/1995 | Deguchi et al. | 348/296 |
| 5,500,675 A | * | 3/1996 | Arakawa et al. | 348/319 |
| 5,754,229 A | * | 5/1998 | Elabd | 348/319 |
| 5,764,289 A | * | 6/1998 | Fukui | 348/323 |
| 5,955,753 A | | 9/1999 | Takahashi | |
| 5,966,174 A | * | 10/1999 | Yamamoto et al. | 348/319 |
| 5,973,311 A | | 10/1999 | Sauer et al. | |
| 6,002,432 A | | 12/1999 | Merrill et al. | |
| 6,008,486 A | * | 12/1999 | Stam et al. | 348/307 |
| 6,084,229 A | * | 7/2000 | Pace et al. | 250/208.1 |
| 6,118,481 A | * | 9/2000 | Hamada | 348/220.1 |
| 6,122,008 A | * | 9/2000 | Komobuchi et al. | 348/312 |
| 6,141,049 A | * | 10/2000 | Harada | 348/296 |
| 6,211,915 B1 | * | 4/2001 | Harada | 348/298 |
| 6,249,618 B1 | * | 6/2001 | Hou | 382/312 |
| 6,320,618 B1 | * | 11/2001 | Aoyama | 348/335 |
| 6,335,757 B1 | * | 1/2002 | Vodanovic | 348/311 |
| 6,365,886 B1 | * | 4/2002 | Ang et al. | 250/208.1 |

(Continued)

*Primary Examiner*—David Ometz
*Assistant Examiner*—John M. Villecco
(74) *Attorney, Agent, or Firm*—Dickstein Shapiro Morin & Oshinsky LLP

(57) ABSTRACT

A frame shutter apparatus comprising a controller for controlling multiple groups of pixels and for reading out values corresponding to the charge collected by different groups of pixels at different times. A method of reading out multiple groups of pixels is provided wherein values corresponding to the charge collected by one group of pixels is readout at a different time than the values corresponding to the charge collected by another group of pixels.

21 Claims, 2 Drawing Sheets

U.S. PATENT DOCUMENTS

| | | | |
|---|---|---|---|
| 6,429,898 B1 * | 8/2002 | Shoda et al. | 348/316 |
| 6,452,634 B1 * | 9/2002 | Ishigami et al. | 348/322 |
| 6,529,242 B1 * | 3/2003 | Panicacci | 348/308 |
| 6,590,198 B1 * | 7/2003 | Zarnowski et al. | 250/214 LS |
| 6,614,472 B1 * | 9/2003 | Yamashita | 348/243 |
| 6,687,026 B1 * | 2/2004 | Steinebach | 358/483 |
| 2005/0206768 A1 * | 9/2005 | Goto | 348/323 |
| 2005/0237407 A1 * | 10/2005 | Bae | 348/308 |
| 2006/0007337 A1 * | 1/2006 | Panicacci | 348/308 |

* cited by examiner

FRAME SHUTTERING SCHEME FOR INCREASED FRAME RATE

CROSS REFERENCE TO RELATED APPLICATIONS

This application claims the benefit of the U.S. Provisional Application No. 60/184,202, filed on Feb. 22, 2000.

BACKGROUND

Active pixel sensors, such as described in U.S. Pat. No. 5,471,215, enable acquisition of images at relatively higher rates. Different pixel circuits have been designed which enable acquiring images at even higher rates. This can enable obtaining image information after a short time of integration, and hence allow very fast snapshots to be taken with such a sensor. The integration times for such a sensor may be considerably shorter than the time it takes to read out a frame, called the "frame readout time". Fast-moving images, therefore, are effectively frozen in time.

A limit on the speed of such a system may be set by the time it takes to read out the entire active pixel array, which may include more than one million pixels. This read out time is typically at least 100 times the length of the frame integration time.

SUMMARY

The inventors have found that the relatively long read out time may prevent capturing multiple images at short time separations. The present application teaches a technique of dividing certain kinds of resolution of the image into multiple different read out images, in order to obtain faster image read out.

BRIEF DESCRIPTION OF THE DRAWINGS

These and other aspects of the invention will be described in detail with reference to the accompanying drawings, wherein.

DETAILED DESCRIPTION

Figure 1:
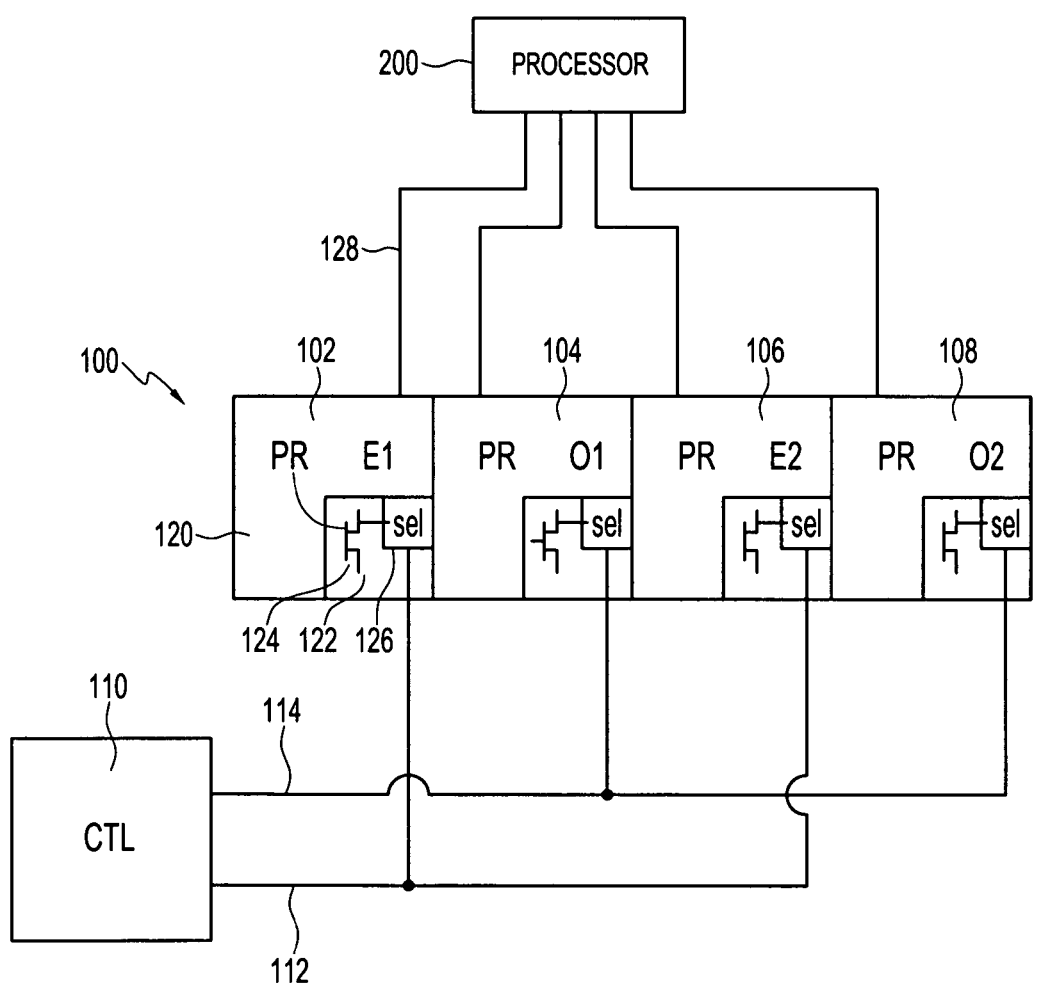
FIG. 1 shows a block diagram of a first embodiment which uses a divide by two scheme.

FIG. 1 shows an embodiment of the present system. A simplified active pixel array 100 is shown in FIG. 1. While the array shown in FIG. 1 has only four pixels, it should be understood that the actual array may have many more pixels, upwards of one million pixels. In the present embodiment, a resolution of an output image is divided by two in order to speed up the read out.

The active pixel sensor includes a plurality of pixels such as 104. Each pixel includes a photoreceptor 120, e.g., a photodiode or a photogate, and a control part 122. The control part may include a pixel follower circuit 124, and a pixel selector circuit 126. The selector circuit is actuated in order to couple charge from the pixel 102 to an output line shown as 128.

A standard frame shutter operates by controlling each of a plurality of timing lines for each row of the active pixel sensor simultaneously. The integration time for each row becomes identical.

The present system operates in a different way. The pixels are divided into groups. In the embodiment of FIG. 1, there are two groups, which include even pixels and odd pixels. FIG. 1 shows the even pixels 102,106, and the odd pixels 104,108.

A controller 110 controls the integration and read out. The row drivers within the controller 110 operate to allow one set of timing for the even grouped pixels 102,106. As shown, the readout line 112 controls all of the even grouped pixels at the same time.

A separate timing, controlled by readout line 114, is used for the odd grouped pixels.

After each integration time, the results are read out using the standard CMOS active pixel sensor row-wise operation. The read out image includes two interleaved images. Each interleaved image has half of the vertical resolution of the sensor, but occurs at a much faster readout time.

The two interleaved images are coupled to an image processor 200, which can be a processor that separates the two images using software to separate the even-based image from the odd-based image.

An alternative provides a modified readout control in the controller 110. In this modified system, first the even group is read out, then the odd group. This directly produces the two interleaved images, and eliminates any need for later reconstruction of the two images.

The FIG. 1 embodiment describes dividing the resolution and hence time to read by two. More generally, it is preferred that each two adjacent pixels integrate at a different time. An alternative embodiment shown in FIG. 2 allows dividing by n. Each of n groups of the active pixel array is sampled at a specific time. The active pixels 202, 204, 206 and 208 correspond to pixel 1–pixel n. This provides separate timing control lines. A first timing control line 210 is for pixel 0, and pixel n, pixel 2n, and so on. The next timing control signal 212 goes to row 1, row n+1 plus one . . . The last timing control lines 214 controls row n−1, 2n−1 . . . The readout image has a vertical resolution which is reduced by the factor of n.

In this embodiment, the readout can occur in the order of the images, that is in the order 0, n, 2n . . . for the first image, then 1, n+1, 2n+1 . . . in order to allow the multiple images to be read out sequentially. When read out in this way, the first resolution divided image will be obtained first, followed by the second resolution divided image.

Figure 2:
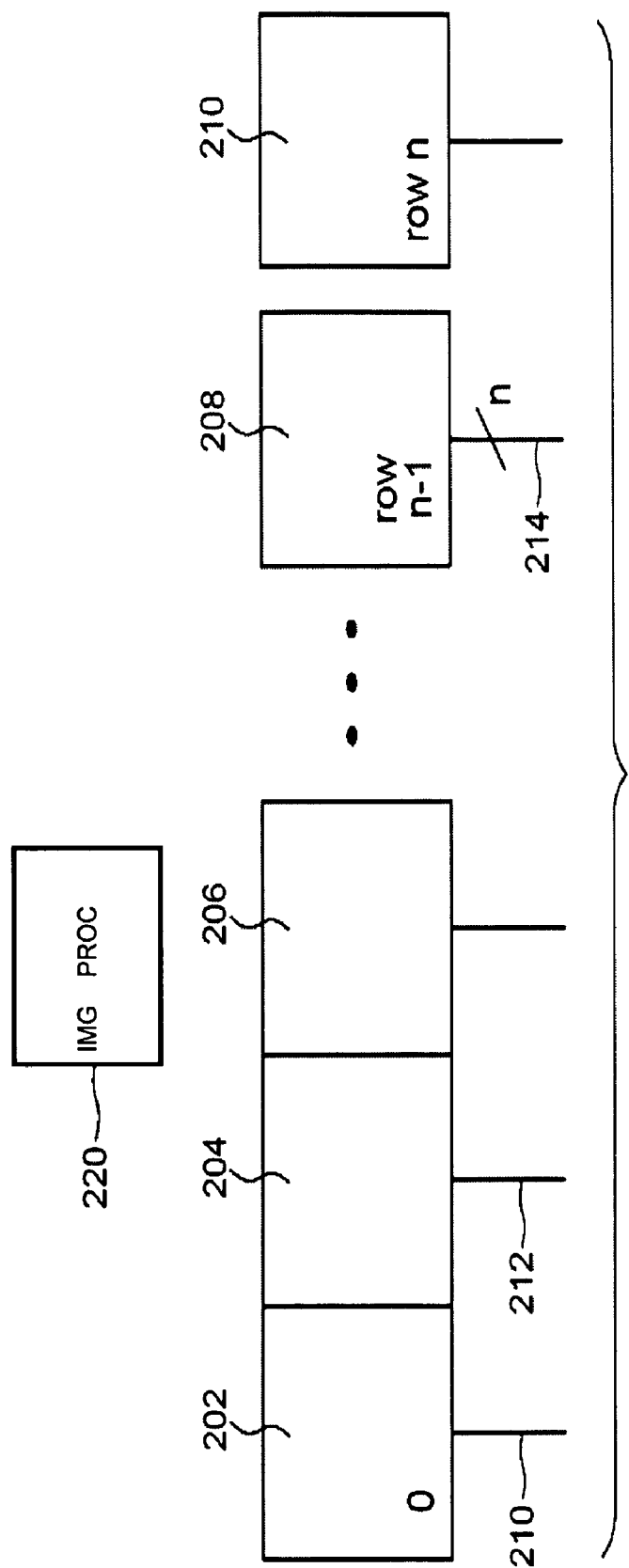
FIG. 2 shows a block diagram of the second embodiment which uses a divide by n scheme.

Alternatively, the FIG. 2 embodiment can read out all images in pixel order in the usual way, and use an image processor 220 to separate the n images.

Although only a few embodiments have been disclosed in detail above, other modifications are possible. All such modifications are intended to be encompassed within the following claims.

Other embodiments are within the disclosed invention.

What is claimed is:

1. A method, comprising:

integrating light indicative of a scene being imaged in a plurality of pixels forming an array of pixel rows and columns, said integrating comprising integrating each of said pixels in said array beginning and ending at substantially the same time;

reading out pixel signals corresponding to said light for all of said rows a row at a time, said reading out comprising dividing the pixels in each row into at least two groups of pixels and reading out one of said at least two groups of pixels of each said row at a different time than another of said at least two groups of pixels of said each row; and forming at least two different image fields from the at least two different groups of pixels for each row when all rows are read out.

2. A method as in claim 1, wherein pixels of one of said at least two groups are adjacent pixels from another of said at least two groups.

3. A method as in claim 2, wherein there are two groups of pixels for each row with the pixels of one group alternating with the pixels of the other group, and wherein said forming at least two different image fields comprises reading alternate pixels of each row for each group to provide two separate image fields when all rows are read out.

4. A method as in claim 2, wherein said forming at least two different image fields comprises reading one of every N pixels in a row to provide N separate image fields when all rows are read out.

5. A method as in claim 2, wherein said reading out produces multiple interleaved images each corresponding to said at least two groups of pixels when all rows are read, said method further comprising separating said multiple interleaved images.

6. A method as in claim 2, wherein said forming at least two different image fields reads out a single interleaved image at a time.

7. An apparatus, comprising:
an array of active pixel sensors arrayed in rows and columns, each including a photoreceptor portion for integrating charge, and a control portion, said control portion enabling activation of said photoreceptors portions between an integrating state and a non integrating state, and also enabling transfer of charge from said photoreceptors portions to an output; and
a controller, controlling said pixel sensors to integrate charge and, for each row of pixels in the array, to cause said transfer of charge to be performed for multiple rows, one row at a time in a plurality of different pixel sensor groups, such that charge from at least a first pixel sensor group in each row is read out at a different time than charge from a second pixel sensor group in each row.

8. An apparatus as in claim 7, wherein said plurality is two.

9. An apparatus as in claim 7, wherein said control portion includes a follower buffer transistor, and a selector.

10. An apparatus as in claim 7, further comprising respective signal lines for receiving an output from said different pixel sensor groups of each row, and wherein said controller controls said pixel sensors to read out charge from respective pixel sensor groups of each row onto respective signal lines.

11. An apparatus as in claim 7, further comprising an image processor which separates a first image field produced by said first pixel sensor group of said array when all rows are read out from a second image field produced by said second pixel sensor group of said array when all rows are read out.

12. An imager array comprising:
a plurality of pixels arrayed in rows and columns;
a control circuit for controlling the integration time and read out of pixel signals such that pixel signals are read out for multiple rows a row at a time, said control circuit causing pixels in a row to be divided into at least two operational groups of pixels, each group having associated column lines, and the pixel signals of one group of said row being read out via its associated column lines at a different time from the pixel signals of another group of said row.

13. an imager array as in claim 12 wherein each operational group of pixels integrates at a different time from at least one other of said operational group of pixels.

14. An imager array comprising:
a plurality of pixels arrayed in rows and columns;
a control circuit for controlling the integration time and read out of pixel signals such that pixel signals are read out for multiple rows a row at a time, said control circuit causing pixels in a row to be divided into at least two operational groups of pixels, each group having associated column lines, and each of the pixels in a group producing a row image output of lower resolution than a row image output obtained using all pixels in a row.

15. An apparatus, comprising:
a plurality of pixels arrayed in rows and columns for integrating photo-generated charges to produce pixel signals representing an image;
a control element which selects pixels in a specified row for read out, causing the pixels to be read out a row at a time, wherein the pixels are divided into at least two groups for the specified row such that pixels in one group read out charge at a different time than pixels in another group.

16. An apparatus as in claim 15, wherein the pixels of one group alternate with the pixels of said another group in said specified row such that two separate image fields are provided from said array when the pixels in all rows are read out.

17. An apparatus as in claim 16, further comprising an image processor, receiving pixel signals from said pixel groups including two interleaved images and providing said two separate image fields.

18. An apparatus as in claim 16, further comprising a readout system, reading out a first image field at a first time to produce a first image, and a second image field at a second time to produce a second image.

19. An apparatus as in claim 15, wherein N groups of pixels are provided for each row, the pixels of one of said N groups being integrated and read out at a different time than the pixels of the other groups in each specified row such that N separate image fields are provided from said array when all rows are read out.

20. An apparatus as in claim 15, further comprising an image processor for receiving signals from said at least two groups of pixels for each row to provide respective outputs indicative of separate image fields for each pixel group.

21. An apparatus as in claim 19, further comprising a readout system for reading out pixels from each row in a specified order in which at least one pixel in each row is skipped between each two read pixels, to read out pixels in the order 0, N, 2N ... to provide a first image, and 1, N+1, 2N+1 to provide a next image and so on to provide the N images when all rows are read out.

* * * * *